UNITED STATES PATENT OFFICE.

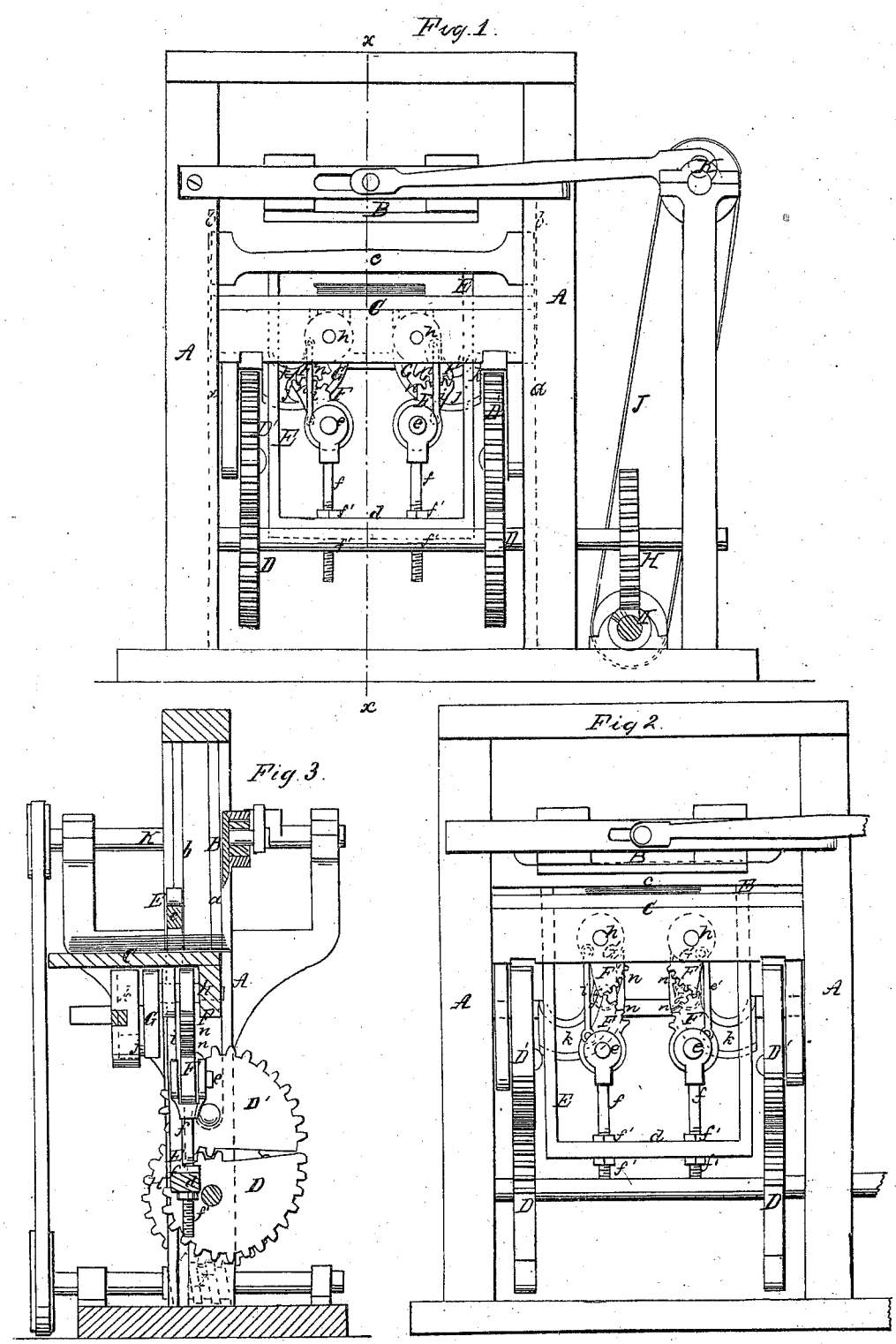

HERVEY LAW, OF NEW YORK, N. Y.

MACHINE FOR CUTTING PAPER.

Specification forming part of Letters Patent No. 15,738, dated September 16, 1856; Reissued July 9, 1867, No. 2,670.

*To all whom it may concern:*

Be it known that I, HERVEY LAW, of the city, county, and State of New York, have invented a new and useful Improvement in Machines for Cutting Paper; and I do hereby declare that the following is a full, clear, and exact description of the same, reference being had to the accompanying drawings, forming part of this specification, in which—

Figure 1, is a front elevation of a machine for cutting paper with my improvement applied. This view shows the position of the parts before being operated. Fig. 2, is a similar view, showing the position of the parts after being operated. Fig. 3, is a vertical transverse section through the line $x$, $x$, in Fig. 1.

Similar letters of reference indicate corresponding parts in the several figures.

The paper-cutting machine to which my improvement is most advantageously applied, employs a horizontal reciprocating knife, rising and falling platform and moving clamping frame.

The nature of my improvement consists in a novel combination of the said platform and clamping frame, by means of toggles which are arranged and provided with cranks, the pintles of which work in curved grooves, as presently described, whereby the paper, or other article to be cut, is automatically clamped and compressed as the platform rises or is being fed up to the knife, and also whereby the paper or other article is automatically unclamped, after being cut, as the platform descends.

To enable others skilled in the art to make and use my invention, I will proceed to describe its construction and operation.

A, represents the frame of the machine.

B, is the reciprocating knife.

C, is the platform upon which the paper is cut; it slides up and down freely in ways $a$, of the frame, being moved by eccentric gearing D, D′, or rack and pinion.

E, is the clamping frame. It also slides in ways $b$, $b$, of the frame A. The upper cross bar $c$, of the frame serves as the clamp and stands above the platform C, the paper being inserted between it and the platform, as illustrated in red.

F, F′, are toggles placed between the platform C, and the lower cross piece $d$, of the clamping frame. The lower levers F, of the toggles are attached by fulcra pins $e$, $e$, to screw standards $f$, $f$, which rest on the lower cross piece $d$, of the clamping frame, and are made adjustable to suit the thickness of the article being cut, by nuts $f'$, $f'$. The upper levers F′, of the toggles are attached by fulcra pins $h$, $h$, to the platform C, as represented. The upper and lower levers are provided with teeth $n$, on their eccentric extremity which gear into each other in a manner to form a movable joint; said levers are also connected together by straps $i$, $i$, in order that they shall rise together at a certain stage of the operation.

G, G¹, are cranks made fast on the fulcra of the upper levers and moving with said levers. Each of these cranks is provided with a horizontal pintle $j$, which plays in a curved groove $k$, formed in the rear part of the frame A, as represented. The pintles of the cranks G, G¹, by running in the grooves $k$, as the platform rises, cause the toggles to move from the position shown in Fig. 1, to the position shown in Fig. 2. And as the platform descends, they cause the toggles to assume the position shown in Fig. 1.

H, is a worm wheel on the shaft of the eccentrics D, D¹, and I, is a worm gearing into H,—J, is a band leading from the worm shaft to the reciprocating knife shaft K.

Operation: The machine being in the condition shown in Fig. 1, a block of paper or other article is placed on the platform, as shown in red, and motion is communicated to the knife shaft, and transmitted to the mechanism by the band J. As the platform rises by the action of the eccentrics D, D¹, the upper lever F′, of the toggles is carried up and made, by the cranks, to assume a vertical position, and in doing so, exerts an upward pressure on the platform and a downward action on the lower levers, which owing to being connected with the upper one, is also caused to assume a vertical position and in doing so descends and exerts a downward pressure on the clamping frame, which in connection with the slow movement of said frame, allows the platform to rise sufficiently to clamp the paper between itself and the upper cross piece of the clamping frame, as shown in Fig. 2, before it is time for the paper to commence feeding to the knife. As soon as the toggles assume a vertical position, as in Fig. 2, the clamping frame commences to rise with the platform at the same speed as it and the paper is fed to the knife. The toggles are caused to exert a pressure between the lower cross bar of the clamping frame and the platform during the feeding and cutting operation, by the pintles of the cranks being confined and moving up in a straight portion of the grooves. The block of paper having been cut through, the motion of the eccentrics is reversed and the platform run down. The platform and clamping frame descend together at the same speed until they arrive at the position shown in Fig. 2, when the platform commences to descend more rapidly than the clamping frame and consequently the paper becomes unclamped as shown in Fig. 1.

Instead of having the platform combined with the clamping frame and to rise and fall with it, by a slight modification it may be kept stationary and the knife stock combined with the clamping frame by similar means as specified, and made to rise and fall with like beneficial results.

What I claim as my invention and desire to secure by Letters Patent, is

The combination of the rising and falling platform C, and clamping frame E, by means of toggles E, E', said toggles having cranks G, G', connected with them, the pintles of which work in curved grooves, or otherwise actuated, substantially as and for the purpose set forth.

HERVEY LAW.

Witnesses:
W<small>M</small> T<small>USH</small>,
I. F. B<small>UCKLEY</small>.

[F<small>IRST PRINTED</small> 1912.]